United States Patent
Yabbo et al.

(10) Patent No.: US 9,083,229 B1
(45) Date of Patent: *Jul. 14, 2015

(54) SYSTEMS AND METHODS FOR LOAD TRANSIENT PREDICTION AND COMPENSATION

(71) Applicant: Marvell International Ltd., Hamilton (BM)

(72) Inventors: Yehoshua Yabbo, Karkur (IL); Eran Segev, Tel Aviv (IL)

(73) Assignee: MARVELL INTERNATIONAL LTD., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 14/337,760

(22) Filed: Jul. 22, 2014

Related U.S. Application Data

(63) Continuation of application No. 13/901,857, filed on May 24, 2013, now Pat. No. 8,816,757.

(60) Provisional application No. 61/651,318, filed on May 24, 2012.

(51) Int. Cl.
| | |
|---|---|
| *H02M 3/02* | (2006.01) |
| *H02M 3/04* | (2006.01) |
| *H02M 3/06* | (2006.01) |

(52) U.S. Cl.
CPC ........ *H02M 3/04* (2013.01); *H02M 3/02* (2013.01); *H02M 3/06* (2013.01)

(58) Field of Classification Search
CPC ............ H02M 3/04; H02M 3/06; H02M 3/02
See application file for complete search history.

(56) References Cited

U.S. PATENT DOCUMENTS

| 7,750,727 B2 | 7/2010 | Kuwagata et al. |
|---|---|---|
| 2002/0153941 A1 | 10/2002 | Tanzawa et al. |

*Primary Examiner* — Jung Kim

(57) ABSTRACT

Systems and methods are provided for regulating power in an integrated circuit system. A system includes a processing unit configured to monitor one or more operating parameters in the integrated circuit system. Based on the one or more monitored operating parameters, the processing unit is configured to predict an occurrence of an event that will cause an increased load on the integrated circuit system and further to assert a voltage adjustment command based on the predicted event. A power regulator is coupled to a power supply. The power regulator is configured to supply a regulated output voltage at a nominal voltage level. The power regulator is further configured to receive the voltage adjustment command and to supply the output voltage at an adjusted output level responsively to the voltage adjustment command.

18 Claims, 5 Drawing Sheets

SYSTEMS AND METHODS FOR LOAD TRANSIENT PREDICTION AND COMPENSATION

CROSS-REFERENCE TO RELATED APPLICATIONS

This application is a continuation of U.S. patent application Ser. No. 13/901,857, filed on May 24, 2013, which claims priority to U.S. Provisional Patent Application No. 61/651,318, filed May 24, 2012, entitled "Load Transient Prediction and Method for Compensation," which is herein incorporated in its entirety.

FIELD

The technology described herein relates generally to power supply and more particularly to power supply subject to transient power demands.

BACKGROUND

Electronic devices require a minimum voltage for proper operation. Should voltage supplied to the electronic device fall below such a level, the device is at risk of becoming unstable or crashing. Conventionally, nominal voltage is supplied at a level so that even in the event of a voltage drop, for example because of a transient load, the voltage remains above the required minimum.

The description above is presented as a general overview of related art in this field and should not be construed as an admission that any of the information it contains constitutes prior art against the present patent application.

SUMMARY

Examples of systems and methods are provided for a system for regulating power in an integrated circuit system. A system includes a processing unit configured to monitor one or more operating parameters in the integrated circuit system. Based on the one or more monitored operating parameters, the processing unit is configured to predict an occurrence of an event that will cause an increased load on the integrated circuit system and further to assert a voltage adjustment command based on the predicted event. A power regulator is coupled to a power supply. The power regulator is configured to supply a regulated output voltage at a nominal voltage level. The power regulator is further configured to receive the voltage adjustment command and to supply the output voltage at an adjusted output level responsively to the voltage adjustment command.

As another example, a method of regulating power in an integrated circuit system includes monitoring one or more system parameters at a processing unit of the integrated circuit system. The processing unit is used to predict the occurrence of an event based on the one or more monitored operating parameters. A voltage adjustment command is asserted based on the predicted event. A supplied output voltage is transitioned from a nominal output level to an adjusted output level based on the voltage adjustment command.

As a further example, a mobile device includes an integrated circuit system disposed in a mobile computing device. The integrated circuit system includes a processing unit configured for communications with a cellular network. The processing unit is further configured to monitor one or more operating parameters in the integrated circuit system. Based on the one or more monitored operating parameters, the processing unit is configured to predict an occurrence of an event that will cause an increased load on the integrated circuit system and further to assert a voltage adjustment command based on the predicted event. A power regulator is coupled to a power supply. The power regulator is configured to supply a regulated output voltage at a nominal voltage level. The power regulator is further configured to receive the voltage adjustment command and to supply the output voltage at an adjusted output level responsively to the voltage adjustment command.

DETAILED DESCRIPTION

Figure 1:
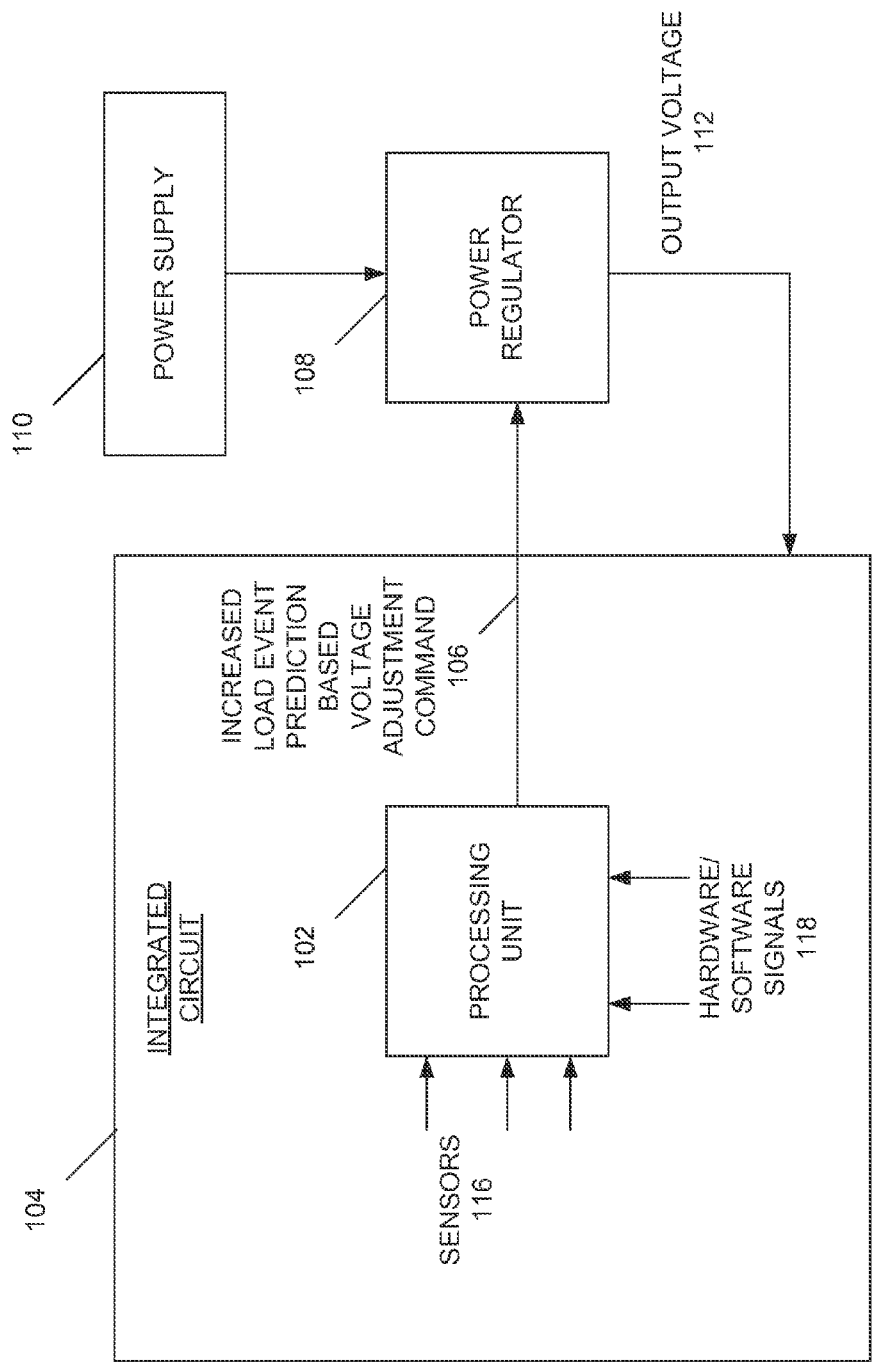
FIG. 1 is a block diagram depicting a system for regulating power in an integrated circuit system.

FIG. 1 is a block diagram depicting a system for regulating power in an integrated circuit system. The system includes a processing unit 102, disposed on an integrated circuit 104, which is configured to monitor one or more operating parameters in the integrated circuit system. Based on the one or more monitored operating parameters, the processing unit 102 is configured to predict an occurrence of an event that will cause an increased load on the integrated circuit system, and the processing unit is further configured to assert a voltage adjustment command 106 based on the predicted event. The integrated circuit system further includes a power regulator 108, such as a buck converter, boost converter, or a low-dropout regulator, coupled to a power supply 110. The power regulator 108 is configured to supply a regulated output voltage 112 at a nominal voltage level. It is noted that, in an embodiment, power regulator is separate from the power supply 110. In alternative embodiments power regulator is a module that is an integral part of the power supply 110 or a module that is disposed in the integrated circuit 104.

The power regulator 108 is further configured, in an embodiment, to receive the voltage adjustment command 106 and to supply the output voltage 112 at an adjusted output level in response to the voltage adjustment command 106. In one embodiment of the disclosure, the power regulator 108 is configured to maintain a target voltage level (e.g., the nominal voltage level or the adjusted output level). When the power regulator 108 is disturbed, such as by a sudden increase in power demand, the output voltage 112 temporarily deviates from the target voltage level. The power regulator 108 remedies this transient deviation over the course of a transient recovery time period. In one embodiment of the disclosure, such target voltage maintenance and recovery is accomplished using a sensed voltage signal from the integrated circuit 104 to the power regulator 108, such as the $V_{sense}$ signal depicted in FIG. 2. In another embodiment, target voltage maintenance and recovery is accomplished using a feedback loop from the power regulator 108 to the power supply 110.

In one embodiment of the disclosure, the power regulator 108 is configured to maintain the output voltage 112 above a minimum operating voltage of a device that receives the output voltage 112. In an embodiment, the output voltage 112 is provided to integrated circuit 104 which is configured as a system on chip that includes the processing unit 102 for as well as other modules that are configured to perform various processing and other functions. Alternatively, output voltage 112 is provided to one or more different devices (not seen).

Certain device events cause instantaneous or otherwise fast changes in power demanded from the power regulator 108, that is, a load induced transient voltage drop. In one example, a device that transitions from an idle to an active state requires additional power from the power regulator 108 at the time of the activation. In conventional systems power regulators are responsive to a feedback loop indicative of required power on the device. At times, the power regulator 108 is unable to react sufficiently fast to such an instantaneous change in power demand when load is increased. As a result, power rails of the device, such as on integrated circuit 104, receiving output voltage 112 at a nominal voltage exhibit a drop in voltage for a transient recovery time period, until power regulator 108 recovers and increases the power it supplies to the device to accommodate the increased load and thereby compensate for the voltage drop.

In one embodiment of the disclosure, the system of FIG. 1 compensates for a drop in the output voltage 112 by adjusting the output voltage 112 at or before a predicted event that will cause a sudden load. When the processing unit 102 predicts an occurrence of a load inducing event, the processing unit 102 commands the power regulator 108 to increase the output voltage 112 from its nominal voltage level to an adjusted output level. When such event occurs, the previously increased output voltage 112 drops by such an amount that the output voltage 112 remains above a minimal operating voltage of the demanding device. Once the power regulator 108 recovers from the load induced transient voltage drop, the processing unit 102 commands the power regulator 108 to return to supplying its nominal voltage. Because, at this point, the transient voltage drop has ended, the output voltage 112 does not fall below the minimum output level even after return to the nominal power regulator voltage.

Such a system offers improved performance over systems that simply operate at a constant higher output voltage by offering an opportunity to operate at a typically lower nominal output voltage while maintaining an output voltage at or above the minimal operating voltage of a demanding device, even during times of changing power demands. Such a system reduces total power consumption and increases production yield by maintaining voltage at a lower nominal level most of the time.

In one embodiment of the disclosure, the processing unit 102 is configured to predict the occurrence of an event based on one or more operating parameters that include sensor signals 116 and hardware or software signals 118. The processing unit 102 monitors one or more of various sensor outputs 116, snooped system signals, such as signals on a data bus, and hardware and software signals that are transmitted to the processing unit 102 directly. The processing unit 102 includes logic to predict the occurrence of an event and to provide a signal to the power regulator 108 causing it to pre-compensate voltage supplied to the device for an expected load induced transient voltage drop that is expected from the occurrence of the predicted event.

Predicted events take a variety of forms. In one example, a predicted event includes a device transitioning from an idle state to an active state. The processing unit 102 predicts that transition, such as by snooping an interrupt from a peripheral device to the processing unit 102. Such an interrupt from a peripheral device that is ready to send data indicates a likelihood that the system is going to wake from its idle state to process the incoming data. In preparation for such waking, the processing unit 102 asserts the voltage adjustment command 106 instructing the power regulator 108 to transition the output voltage 112 to the adjusted voltage level. Predicted events take a number of other forms as well in other embodiments, such as predicted activation of a transmitter module, such as a cellular telephone modem, based on the receipt of data to be transmitted in a transmit buffer and predicted activation of a graphics processing unit based on selection of a video file for playback.

Figure 2:
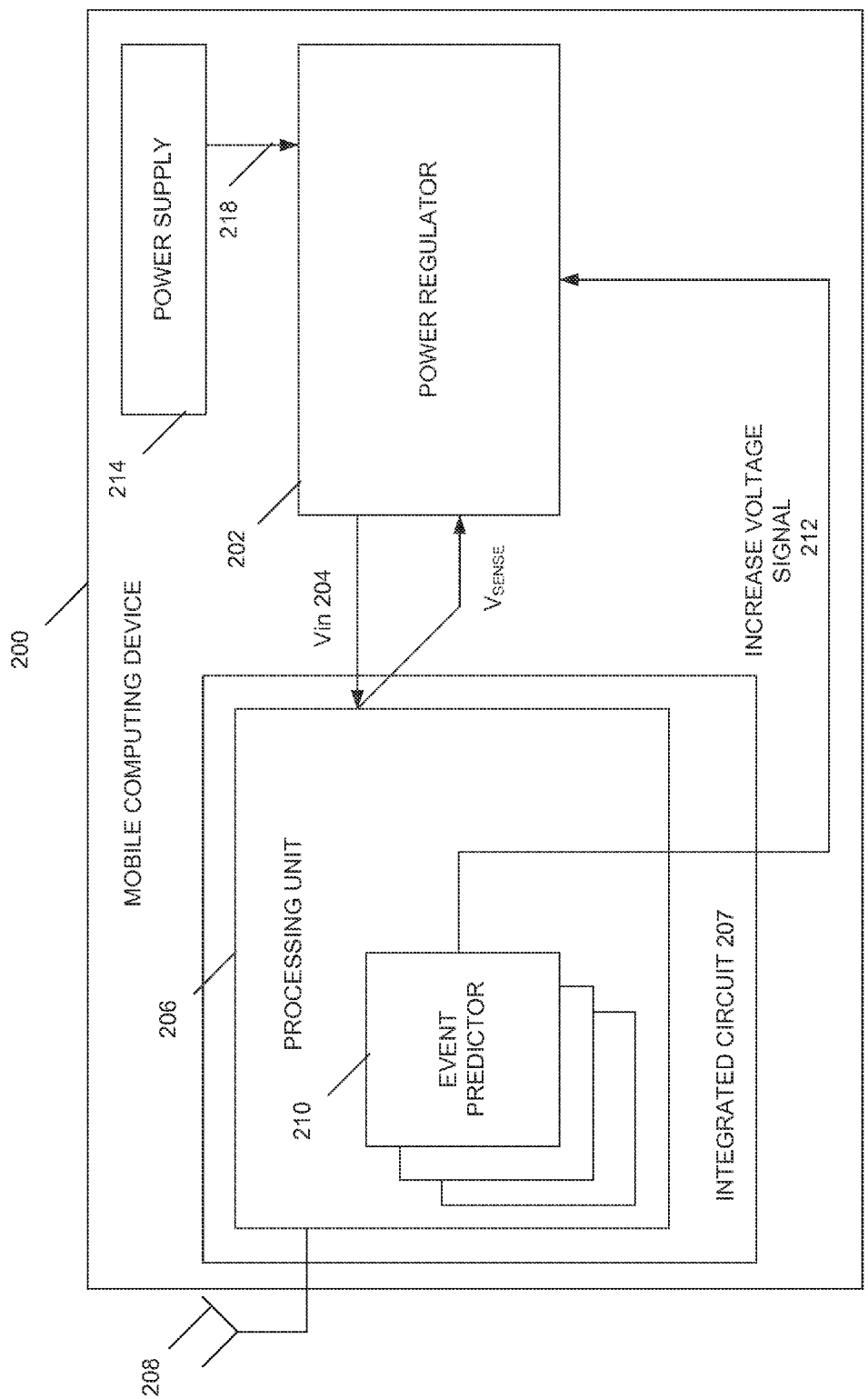
FIG. 2 is a block diagram depicting a mobile computing device where the power supply is providing power to an integrated circuit including a processing unit that predicts events.

FIG. 2 is a block diagram depicting a mobile computing device where the power supply is providing power to a processing unit that predicts events. In the example of FIG. 2, a mobile computing device 200 includes a power regulator 202 that provides an input voltage $V_{in}$ 204 to a processing unit 206 that is disposed on an integrated circuit 207. It is noted that a typical mobile computing device embodiment includes numerous modules, some of which are disposed on the integrated circuit 207 along with processing unit 206 in a system-on-chip configuration. In other embodiments, one or more modules are disposed on different integrated circuit devices. In the embodiment of FIG. 2, the processing unit 206 is configured to perform a variety of tasks such as performing communication functions in interfacing with a cellular network via an antenna 208. The processing unit 206 includes one or more event predictors 210 configured to detect different events at the processing unit 206. For example, in an embodiment, a first event predictor 210 is configured to monitor certain operating parameters to predict when the processing unit 206 is to transition from an idle to an active state, while other event predictors 210 monitor other operating parameters to predict other events such as commencement of a communication session, activation of a graphics processor unit, activation of an audio playback device and the like. When the first event predictor 210 predicts the processing unit 206 transitioning to an active state, for example, the event predictor 210 asserts an increase voltage signal 212 to the power regulator 202. In response to the increase voltage signal, the power regulator 202 adjusts the output voltage 204 to a transient voltage level that is set such that the expected transient voltage drop on power rails in integrated circuit 207 due to the event does not reduce the voltage on the integrated circuit 207 below a minimum level.

In one embodiment of the disclosure, the processing unit 206 is inhibited from entering the active state for a time period t after the event predictor 210 predicts the transition. Such an inhibition allows for the power regulator 202 to adjust the input voltage 204 to the level demanded by the increase voltage signal 212 prior to the processing unit 206 entering the active state so that the voltage 204 on the integrated circuit 207 does not drop below a minimum output level, such as a minimum operating voltage for the processing unit 206. Once the input voltage 204 has reached the adjusted level, the processing unit 206 is permitted to enter the active state.

In another embodiment of the disclosure, the processing unit 206 signals the power regulator 202 to output the increased adjusted voltage at 204 for a limited period of time. When an event is predicted, the processing unit 206 commands the power regulator 202 to increase the input voltage 204 in anticipation of the predicted event. When the event occurs, additional power is required from the power regulator 202, and the voltage 204 on the integrated circuit 207 drops. However, the drop is from the adjusted voltage level, such that despite the voltage drop, the input voltage 204, and consequently voltage on the IC itself, remains above the minimum operating voltage of the processing unit 206. Once the input voltage 204 has recovered to the adjusted voltage, the increase voltage signal 212 is discontinued, and the power regulator 202 is able to return the output voltage 204 to its nominal voltage level, even with the increased power draw of the processing unit 206 operating in an active state.

Figure 3:
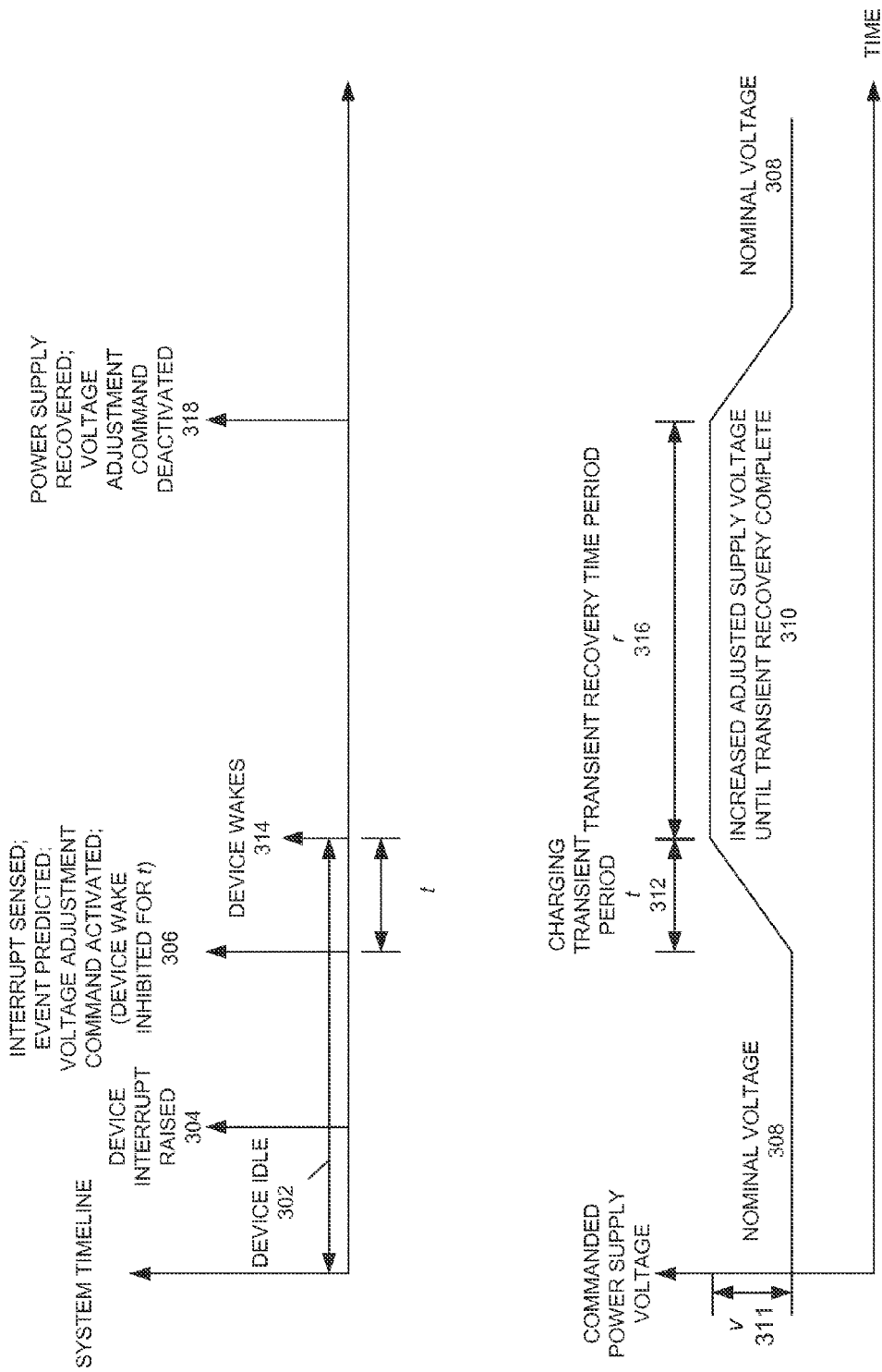
FIG. 3 is a diagram depicting a comparison between a system timeline and a commanded power supply voltage.

FIG. 3 is a diagram depicting a comparison between a system timeline and a commanded power supply voltage, in accordance with an example embodiment. During an initial period, in the example, the system operates in a sleep state, where a device of the system is idle, as indicated at 302. At 304 an interrupt is raised, such as an interrupt from a peripheral that communicates with the device. In one example, the interrupt informs the device that data is ready to be transmitted from the device over a cellular telecommunications uplink. At 306, the interrupt is sensed, such as by a processing unit that is configured to control a power regulator. Upon sensing the interrupt alone or in combination with other sensed system parameters, that processing unit predicts that the device is about to transition from its idle state to an active state. Based on that prediction, the processing unit asserts a voltage adjustment signal to the power regulator that instructs the power regulator to increase its voltage from a nominal level 308 to an increased adjusted level 310. The commanded voltage increase is of magnitude v 311 that is based on an expected magnitude of the load induced transient voltage drop. The transition from the nominal voltage 308 to the increased adjusted voltage 310 occurs during a charging transient period 312 of length t. In one embodiment of the disclosure, the prediction at 306 is made sufficiently in advance of the device entering the active state that the power regulator is able to transition from the nominal voltage level 308 to the adjusted level 310 before the current load is increased, resulting in the transient voltage drop (e.g., the prediction at 306 is made more than t time before the device increases its power demand at 314). In one embodiment of the disclosure, when the prediction is not made sufficiently in advance (i.e., the prediction at 306 is made less than t time before the device increases its power demand), the processing unit inhibits the device from entering a load inducing state, such as the active state, until the time period t has elapsed. In other embodiments, the device enters an active state regardless of any input from the processing unit that controls the power regulator. Regardless of the ability of the processing unit to delay entry of the device into an active mode, the adjustment to the regulator voltage offers the opportunity to eliminate or minimize drops in the power regulator voltage below the minimum output level.

At 314, the device wakes. The sudden increase in power demand of the power supply by the device will cause a load induced transient drop in the power regulator voltage. The power regulator will remedy that drop in voltage over the course of a transient recovery time period r 316. Maintaining the commanded increased adjusted supply voltage target 310 during transient recovery time period r 316 ensures that the actual power regulator voltage remains above the minimum operating level of the demanding device. Once the power regulator has recovered at 318, the voltage adjustment command to the voltage regulator is deactivated, and the voltage regulator is permitted to settle to the nominal voltage 308. The event can then continue, even beyond the length of time r, without the voltage falling below a minimum level.

Figure 4:
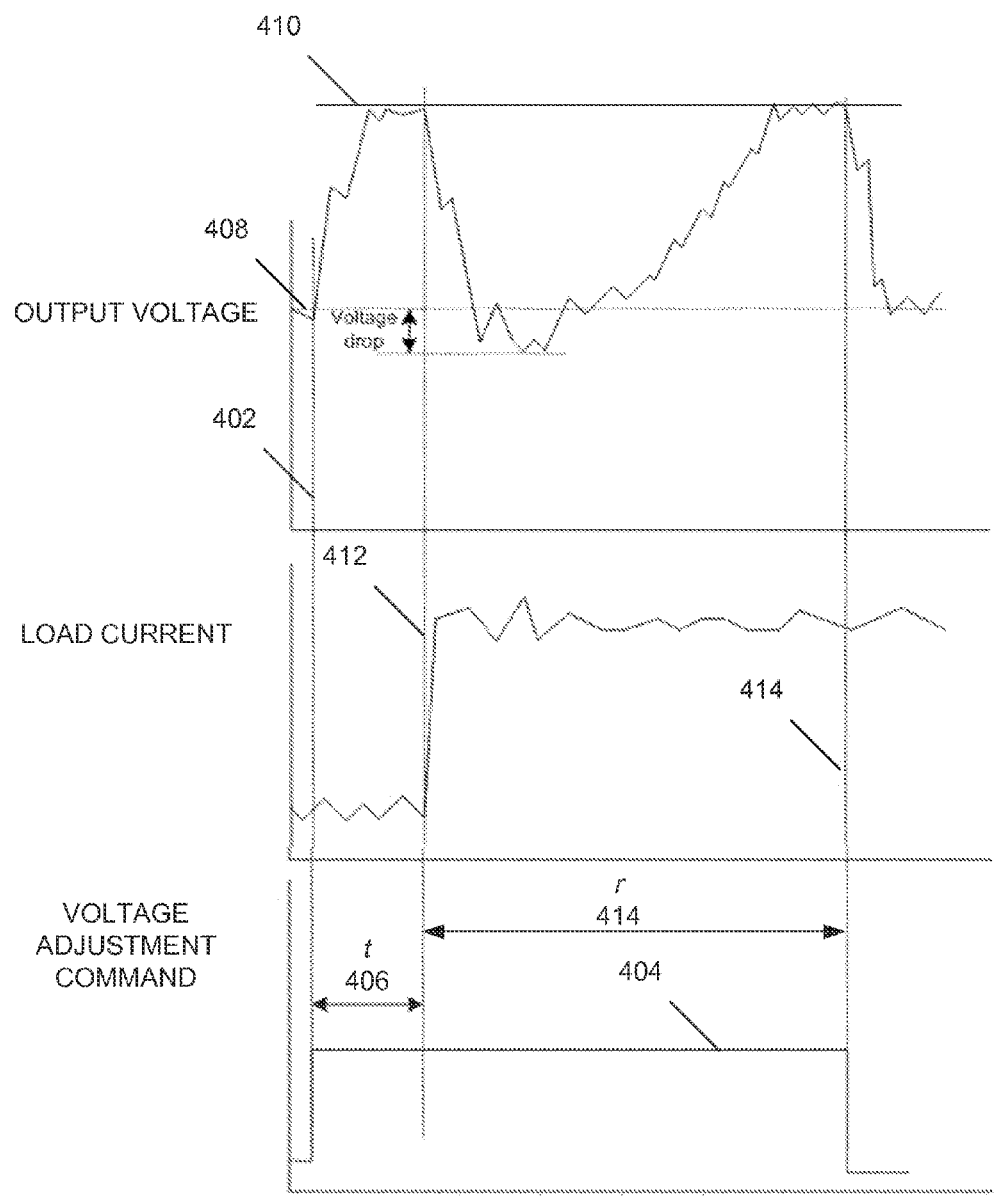
FIG. 4 is a timeline illustrating an example relationship between an output voltage, a load current, and a voltage adjustment command.

FIG. 4 is a timing graph illustrating an example relationship between an output voltage, a load current, and a voltage adjustment command. At 402, a processing unit predicts an occurrence of an event. In response to that prediction, the processing unit asserts a voltage adjustment command as indicated at 404. During a charging transient period t 406, the output voltage of the voltage regulator increases from a nominal level 408 to an adjusted output level 410. The event occurs at 412, as indicated by the sudden increase in load current. The event causes a load induced transient voltage drop that extends from the adjusted output level 410 through the nominal level 408. However, that voltage drop does not extend significantly below the nominal level 408, such that the voltage drop does not extend below a minimum operating level of the device demanding the increased power. During a transient recovery time period r 414, the power regulator recovers the output voltage to the adjusted output level 410. Once the output voltage has recovered, the voltage adjustment command is deasserted at 414, and the output voltage recedes to the nominal voltage level 408, even if the event is still ongoing.

In one embodiment of the disclosure, when the processing unit predicts a second event that is expected to induce a second load induced transient voltage drop, the voltage adjustment command is asserted for a longer time period that extends beyond the recovery time period r for the first event so that the voltage regulator has time to recover from the second load induced transient voltage drop caused by the second event.

In another embodiment of the disclosure, certain parameters of the system are set on an event specific basis. For example, with reference to the embodiment of FIG. 2, each of the event predictors 210 is configured to predict different groups of events. Each of those groups of events results in a different expected load induced transient voltage drops, where different values for the delay time period t, the recovery time period r, and the adjustment voltage v are utilized to best account for the different expected load induced transient voltage drops. In one example, a processing unit is configured to associate a first delay time period $t_1$, a first recovery time period $r_1$, and a first adjustment voltage $v_1$ with a device activation event, and the processing unit is configured to associate a second delay time period $t_2$, a second recovery time period $r_2$, and a second adjustment voltage $v_2$ with a peripheral activation event based on the different power demands of those events and accordingly the different expected load induced transient voltage drops.

In one embodiment of the disclosure, the expected load induced transient voltage drop of the regulated output voltage is determined as a function of the expected change in current demand, dI/dt, using the datasheet for the voltage regulator. In one example, the expected voltage drop is 40 mv for a 500 mA/μs change in current demand. An adjustment voltage v is set based on that expected voltage drop for all events that would result in the 500 mA/μs change in current demand. The delay time period t is set based on v, as the time period that it takes the voltage regulator to transition from its nominal voltage level to an adjusted voltage level that is v greater than the nominal voltage level. The recovery time period r is set based on the time that it takes the voltage regulator to recover from a load induced transient voltage drop of magnitude v. With the delay time period t and the recovery time period r being computable based on the adjustment voltage v and parameters of the voltage regulator, and the adjustment voltage v being computable based upon the expected current demand change of the event, values of t, r, and v are stored for different events grouped according to their anticipated instantaneous current demands.

Figure 5:
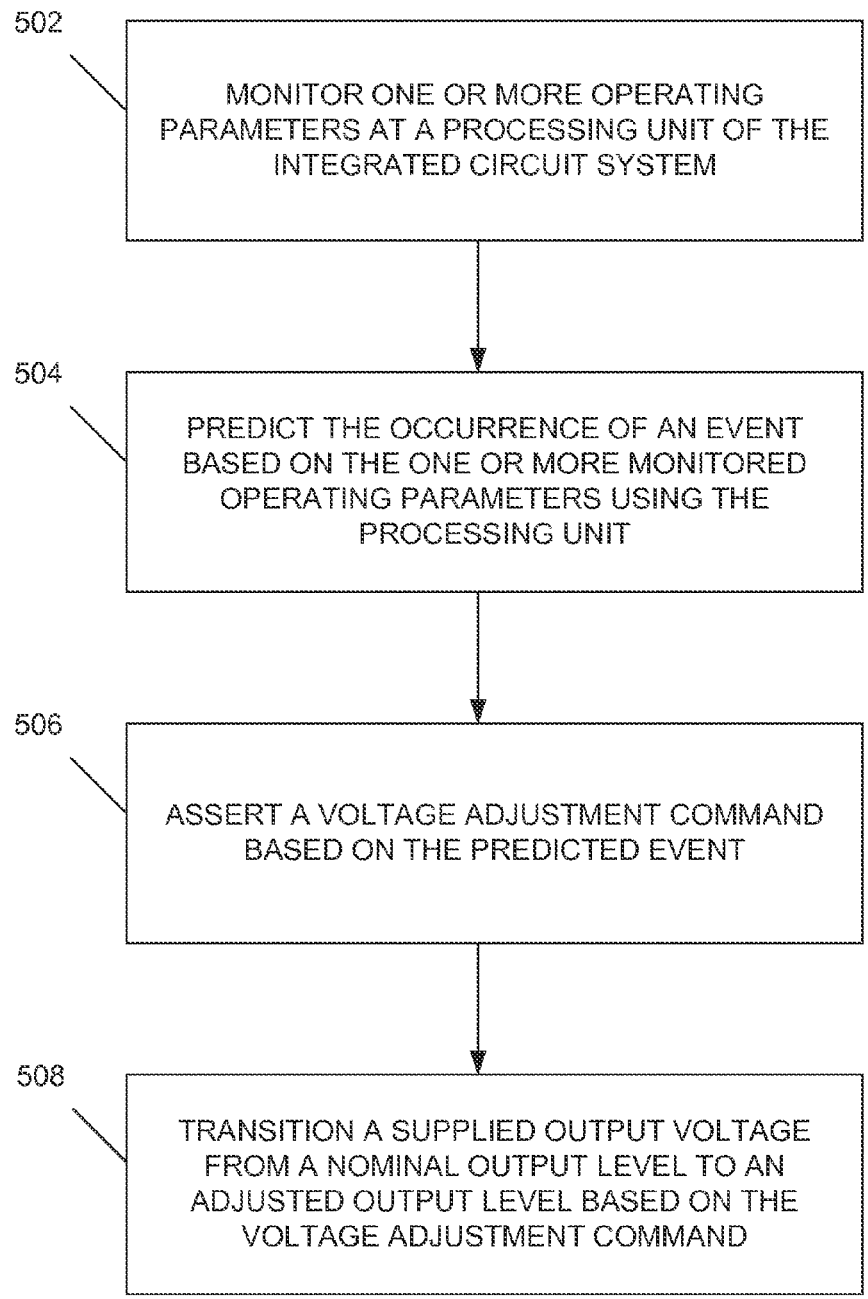
FIG. 5 is a flow diagram depicting a method of regulating power in an integrated circuit system.

FIG. 5 is a flow diagram depicting a method of regulating power in an integrated circuit system. At 502, one or more operating parameters are monitored at a processing unit of the integrated circuit system. A processing unit is used to predict the occurrence of an event based on the one or more monitored operating parameters at 504. At 506, a voltage adjustment command is asserted based on the predicted event, and at 508, a supplied output voltage is transitioned from a nominal output level to an adjusted output level based on the voltage adjustment command.

This application uses examples to illustrate the invention. The patentable scope of the invention includes other examples. For example, in embodiments of the disclosure, the integrated circuit 104 of FIG. 1 is a component of a network switch, a network controller, a server, a gateway, a high-definition television, or a digital mass storage device.

What is claimed is:

1. A system comprising:
   a power regulator configured to supply an output voltage at a nominal voltage level to power an integrated circuit; and
   a processing unit configured to
      detect an occurrence of an event that is predictive of the integrated circuit imminently performing an operation that will draw increased load causing a transient drop in the output voltage, the integrated circuit being capable of performing the operation when powered at the nominal voltage; and
      control, in response to detecting the event and prior to the beginning of the operation, the power regulator to increase the output voltage to an increased voltage level that is higher than the nominal voltage level.

2. The system of claim 1, wherein the processing unit is configured to control the power regulator to render the increased voltage level sufficiently high such that the output voltage will remain, during the transient drop in the output voltage, above a minimal operating voltage that the integrated device requires for performing the operation.

3. The system of claim 1, wherein the event is at least one of the integrated circuit awaking from an idle state to an active state, commencement of a communication session, activation of a graphics processor unit, activation of an audio playback device, activation of a transmitter module based on receipt of data to be transmitted in a transmit buffer, and activation of a graphics processing unit based on selection of a video file for playback.

4. The system of claim 1, wherein the processing unit is further configured to:
   delay commencing the operation until the output voltage is increased to the increased voltage.

5. The system of claim 1, wherein the processing unit is further configured to:
   store different increased voltage levels to be applied in response to the predicted performance of different operations.

6. The system of claim 1, wherein the power regulator is configured to effect, after the transient drop, a recovery of the output voltage to the increased voltage level before an end of the operation, and wherein the processing unit is further configured to, after the recovery and before the end of the operation:
   control the power regulator to lower the output voltage to the nominal voltage level.

7. The system of claim 6, wherein the processing unit is configured to initiate the lowering of the output voltage to the nominal voltage level upon expiration of a predetermined delay time period from the beginning of the operation.

8. The system of claim 1, wherein performance of the operation by the integrated circuit decreases the output voltage from the increased voltage level to a dropped voltage level that is lower than the nominal voltage level but sufficient to enable the integrated circuit to perform the operation.

9. A mobile electronic device comprising the system of claim 1.

10. A method comprising:
    supplying, by a power regulator, an output voltage at a nominal voltage level to power an integrated circuit;
    detecting, by a processing unit, an occurrence of an event that is predictive of the integrated circuit imminently performing an operation that will draw increased load causing a transient drop in the output voltage; and
    controlling, by the processing unit, in response to detecting the event and prior to the beginning of the operation, the power regulator to increase the output voltage to an increased voltage level that is higher than the nominal voltage level, wherein the controlling includes controlling the power regulator to increase the output voltage to the increased voltage level despite the integrated circuit being capable of performing the operation when powered at the nominal voltage.

11. The method of claim 10, wherein the controlling includes controlling the power regulator to render the increased voltage level sufficiently high such that the output voltage will remain, during the transient drop in the output voltage, above a minimal operating voltage that the integrated device requires for performing the operation.

12. The method of claim 10, wherein the event is at least one of the integrated circuit awaking from an idle state to an active state, commencement of a communication session, activation of a graphics processor unit, activation of an audio playback device, activation of a transmitter module based on receipt of data to be transmitted in a transmit buffer, and activation of a graphics processing unit based on selection of a video file for playback.

13. The method of claim 10, further comprising:
    delaying, by the processing unit, commencement of the operation until the output voltage is increased to the increased voltage.

14. The method of claim 10, further comprising:
    storing, by the processing unit, different increased voltage levels to be applied for different operations.

15. The method of claim 10, further comprising:
    effecting, by the power regulator after the transient drop, a recovery of the output voltage to the increased voltage level before an end of the operation; and
    controlling, by the processing unit after the recovery and before the end of the operation, the power regulator to lower the output voltage to the nominal voltage level.

16. The method of claim 10, wherein the processing unit is configured to initiate the lowering of the output voltage to the nominal voltage level upon expiration of a predetermined delay time period from the beginning of the operation.

17. The method of claim 10, wherein the transient drop decreases the output voltage from the increased voltage level to a dropped voltage level, the dropped voltage level being lower than the nominal voltage level but sufficient to enable the integrated circuit to perform the operation.

18. The method of claim 10, wherein the controlling is by the processing unit outputting a voltage adjustment command signal to the power regulator.

* * * * *